C. S. EDWARDS.
TIRE TOOL.
APPLICATION FILED MAR. 12, 1912.
1,059,128.
Patented Apr. 15, 1913.
2 SHEETS—SHEET 2.
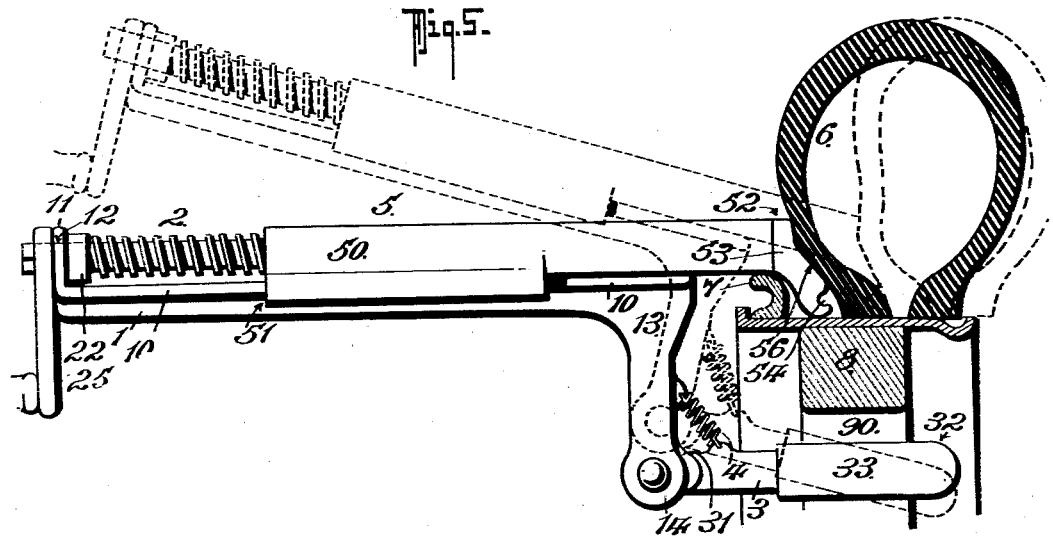
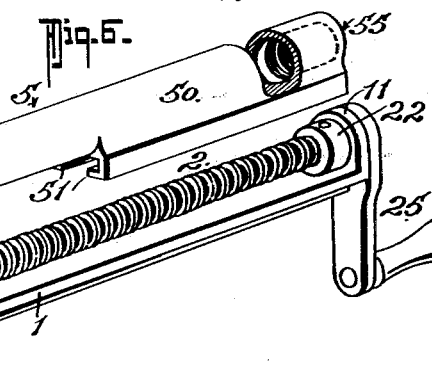
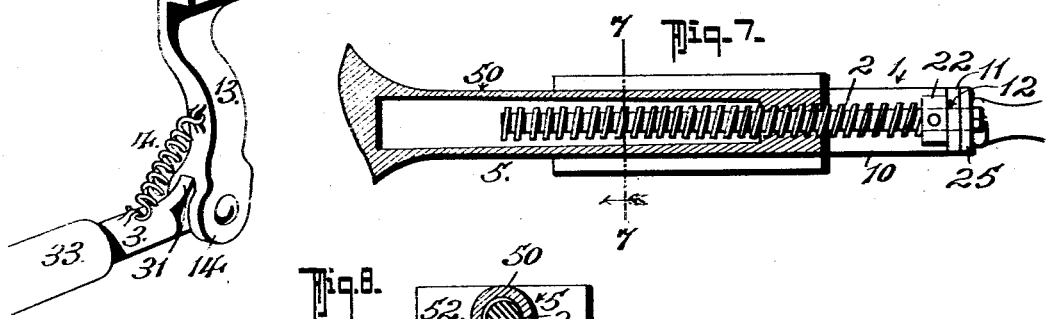
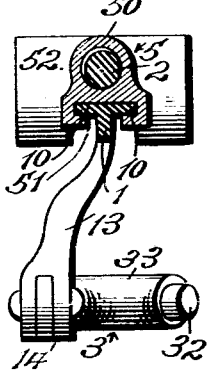
WITNESSES:
Robert M. Grunwell
Hayward Woodard
INVENTOR
Charles S. Edwards
BY
Fred G. Dieterich
ATTORNEYS

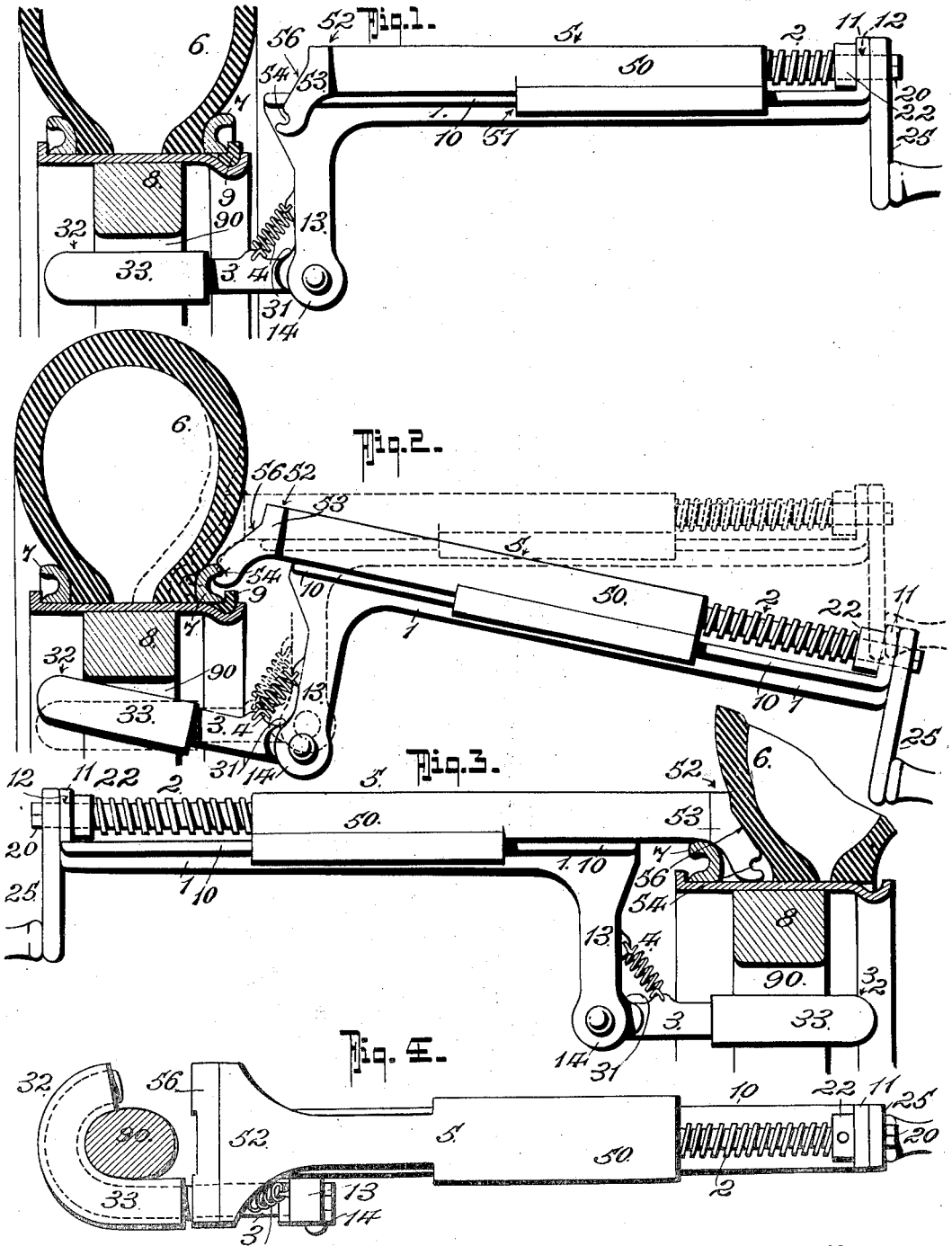

UNITED STATES PATENT OFFICE.

CHARLES S. EDWARDS, OF PRINEVILLE, OREGON.

TIRE-TOOL.

1,059,128.  Specification of Letters Patent.  Patented Apr. 15, 1913.

Application filed March 12, 1912. Serial No. 683,365.

*To all whom it may concern:*

Be it known that I, CHARLES S. EDWARDS, residing at Prineville, in the county of Crook and State of Oregon, have invented a new and Improved Tire-Tool, of which the following is a specification.

This invention relates to that class of tools more especially designed for applying or removing automobile tires, and it primarily has for its object to provide a tool of the character noted of a simple and economical construction that is easily operable and efficient for its intended purposes.

Another object of this invention is to provide a tire tool which while capable of use in connection with the ordinary run of tires is more particularly adapted for the removal and application of "Dunlop" or mechanically fastened tires and which is also useful for taking off and putting on the tire retaining rings.

With further objects in view that will be hereinafter apparent this invention consists of a tire tool embodying the peculiar and novel features of construction hereinafter fully explained, specifically pointed out in the appended claims and illustrated in the accompanying drawings, in which:

Figure 1, is a side elevation of the tool, the same being shown applied to the wheel and in a "normal" position. Fig. 2, is a similar view, showing the sliding or pusher device set for forcing the retaining ring and the adjacent tire edge away from the clencher member of the rim, the tool being shown at its lever shifted position for prying in the retaining ring, in dotted lines. Fig. 3, is a detail view, in side elevation, showing the tool set for pushing the tire off the rim of the wheel, the tire and wheel rim being shown in section. Fig. 4, is a plan view of the tool, the vehicle spoke being in section. Fig. 5, is a side view of the tool, showing the sliding or pusher device set for forcing the tire off the rim of the wheel, the tool being shown at its lever shifted position for pushing the tire off, in dotted lines. Fig. 6, is a perspective view of the several parts that constitute the tool, separated from each other. Fig. 7, is a longitudinal section of the screw feed portions thereof. Fig. 8, is a cross section of the same on the line 7—7 on Fig. 7.

In carrying out my invention, I furnish a tool consisting of a member 1 in the nature of a flat bar, the opposite edges of which form guides 10. At the outer end member 1 has a vertical flange 11, apertured at 12 for the passage of the shank 20 of a feed screw 2, which also carries a collar 22, located on the inside of the flange 11, through which the shank 20 passes.

25 is a crank handle on shank 20.

The member 1 also has an integral pendant arm or bracket 13, the lower end 14 of which is bifurcated and apertured to receive the inner end of a spoke gripping member 3, pivotally mounted in the said end 14 and held to an upper or normal position relatively to the member 1, by a coiled spring 4 joined at the ends to the bracket 13 and the gripping member 3, the latter having a stop-shoulder 31 for engaging the bracket, as shown. The outer end of member 3 terminates in a hook 32 for slipping over the wheel spokes and it has a yielding covering 33 to avoid marring the spokes when applied.

5 designates a pusher device or member that comprises a tubular body 50 having at the rear end a solid nut portion 55 that is internally threaded for receiving the screw 2, as is best shown in Fig. 6, and at the said end the member 5 has pendant hook-like flanges 51 for sliding on the guides 10 of the stationary member 1, see Figs. 1 and 7. The pusher 5 has a head member 52 at the inner end for engaging the tire and the said head includes downwardly and forwardly projecting ends 53. The ends 53 have transverse grooves 54 for engaging the detachable flange and a curved seat 56 for engaging the tire.

6 designates the ordinary tire tube, 7 the detachable flanges, 8 the wheel rim, and 9 the locking ring, and 90 the wheel spoke.

From the foregoing taken in connection with the drawings it is believed the constructions and the general manner of its use and the advantages of my invention will be readily apparent to those skilled in the art to which it appertains.

In view of the peculiar construction and arrangement of the parts shown and described, in applying the tool, it is only necessary to hook the member 3 around the spoke and apply the head 52 against one of the detachable flanges 7 as indicated in full lines in Fig. 2 of the drawings. The tool is then swung up to the position shown in dotted lines in Fig. 2, which forces the tire and flange inwardly away from the locking ring 9 at the corresponding side, and the locking ring 9 is removed. The tool is then detached from the wheel, and the flange 7 at the side from which the locking ring has been removed is slipped off the rim 8, after which, the tool is applied to the opposite side of the wheel as indicated in Fig. 3, with the head 52 in engagement with the corresponding side of the tire. By then turning the crank to operate the feed screw 2, the tire can be readily turned off the rim.

After having partially pushed off the tire at one point, the same operation is repeated by attaching the tool to another nearby spoke and again repeating all the way around the tire. After thus having initially pried off (or on) the tire, the pusher member is fed farther forwardly to force the tire off farther and the prying operation is repeated as before.

While I prefer to arrange the several parts that constitute the tool in the manner shown and described, I do not purpose to confine myself to the said exact arrangement, since these may be readily varied or modified and be within the spirit and the scope of the appended claims.

For example, the coiled spring for holding up the hook 3, need not be exposed, but may be incased in any well known manner, again in place of the flat guide plate, the said part could be made tubular and the sliding or pusher member made to reciprocate within the tubular part and held from turning by the well-known groove and spline connection. Again in place of the crank handle 25 a wheel could be used for turning the screw.

What I claim is:—

1. A tire tool having a spoke gripping member, a lever coöperatively connected to the said member, a prying element longitudinally slidable upon the lever and including a member for engaging and shifting the detachable flange in advance of engaging and prying off the tire, and means for advancing the said prying element as the tire is shifted.

2. In a tire tool, means for removably gripping a spoke, a lever having a long and a short arm and coöperatively joined therewith, means tending to normally hold said gripping means in parallelism with the long arm of said lever, a tire engaging element carried by the lever for applying a prying force to the tire and other means mounted on the lever for shifting the tire engaging element to or from the tire.

3. In a tire tool, a gripping means, a lever pivoted to said gripping means and including a slideway, a pusher mounted on said slideway and having a tire and detachable flange engaging head, and means for operating said pusher.

4. In a tire tool, a spoke gripping means, a tire prying element, said element including a portion for engaging the tire retaining flange, a lever coöperatively joined with the spoke gripping means, feed devices mounted on the lever for reciprocably shifting said tire prying element with respect to the tire and the retaining flange, said feed devices including screw shaft and screw sleeve connections.

5. In a tire tool, a gripping means, a lever pivoted to said gripping means and including a slideway, a pusher mounted on said slideway and having a tire and detachable flange engaging head, and means for operating said pusher, and means continuously tending to move said lever toward said gripping means.

6. A tire tool comprising a spoke gripping member, a lever pivotally mounted on the said member, a tire engaging member having a head and being mounted upon and having longitudinal adjustment relatively to the said lever, and means mounted on the lever for forcing the head against the tire.

7. In a tire tool, a prying lever adapted to be hooked onto the spokes of the wheel, an internally threaded body slidably mounted upon said lever, said body including a head for engaging the tire, said head including a supplemental portion for first engaging and shifting the detachable flange, and means including a screw for engaging the threaded body mounted upon the lever for shifting the said body upon the lever.

8. In a tire tool, a prying lever adapted to be hooked onto the spoke of the wheel; said lever including a shiftable member having a tire engaging head and a portion for engaging the detachable flange, said portion being projected in advance of the engaging head, and means for shifting the said member, means including a screw shaft and screw sleeve connection, said means including crank actuated mechanism for reciprocatably moving the shiftable member on the lever and in the direction of the lever.

9. A tire tool comprising a member adapted for gripping a wheel spoke, a lever fulcrumed on the gripping member, means for maintaining a relatively normal relation of the lever and the spoke gripping member, said lever including a pushing element for engaging the tire, said element having a supplemental portion for engaging the detachable flanges, and means on the lever for moving the pushing element.

10. A tire tool comprising a member adapted for gripping a wheel spoke, a lever fulcrumed on the gripping member, means for maintaining a relatively normal relation of the lever and the spoke gripping member, said lever including a pushing element for engaging the tire, said element having a supplemental portion for engaging the tire retaining rings, means on the lever for moving the pushing element, said means including a screw shaft fixedly mounted on the lever, and a screw sleeve that forms a part of the pushing element.

11. In a tire tool, an element adapted to hook over a wheel spoke, a lever pivotally connected to the said element, a member connected with and longitudinally shiftable on the lever, means mounted on the lever for shifting the said member, the said member having a head for engaging the tire, the said head having outwardly projecting portions provided with grooves for engaging and shifting the detachable flange.

12. In a tire tool, a wheel engaging member, a lever pivoted to said member and including a slideway projecting at right angles to the pivot end of the lever, a slide mounted on said slideway and including a bifurcated head to straddle said slideway, said head having provision for engaging the detachable flange and tire of a wheel, and means mounted on said slideway and engaging said slide for moving said slide along said slideway.

13. In a tire tool, a wheel engaging member, a lever pivoted to said member and including a slideway projecting at right angles to the pivot end of the lever, a slide mounted on said slideway and including a bifurcated head to straddle said slideway, said head having provision for engaging the detachable flange and tire of a wheel, and means mounted on said slideway and engaging said slide for moving said slide along said slideway, and a spring connection between said lever and said wheel engaging means for continuously tending to draw said parts together.

CHARLES S. EDWARDS.

Witnesses:
M. R. ELLIOTT,
R. S. PRICE.